March 27, 1928.
J. L. CREVELING
LUBRICATING MEANS
Filed Dec. 15, 1920
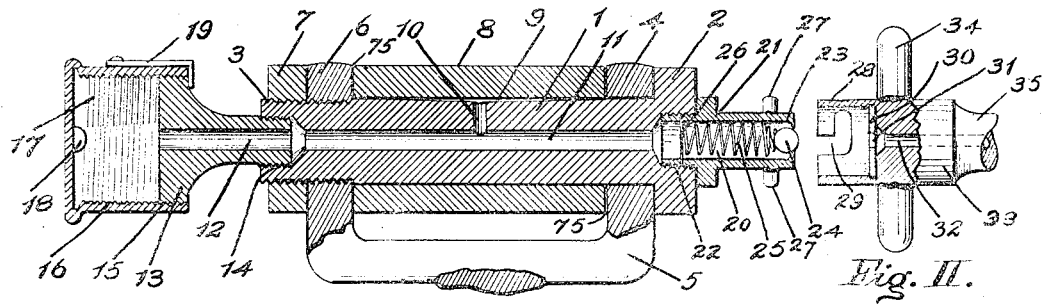
Fig. I.
Fig. II.
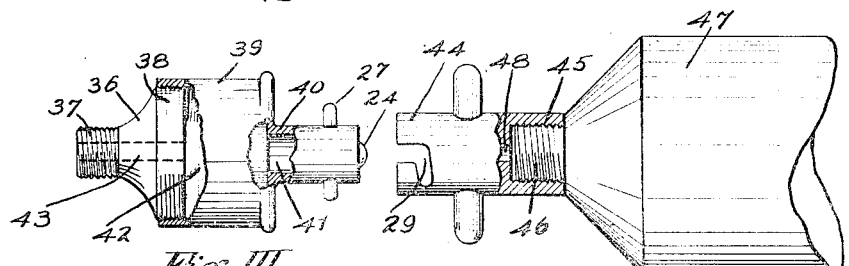
Fig. III.
Fig. IV.
Fig. V.
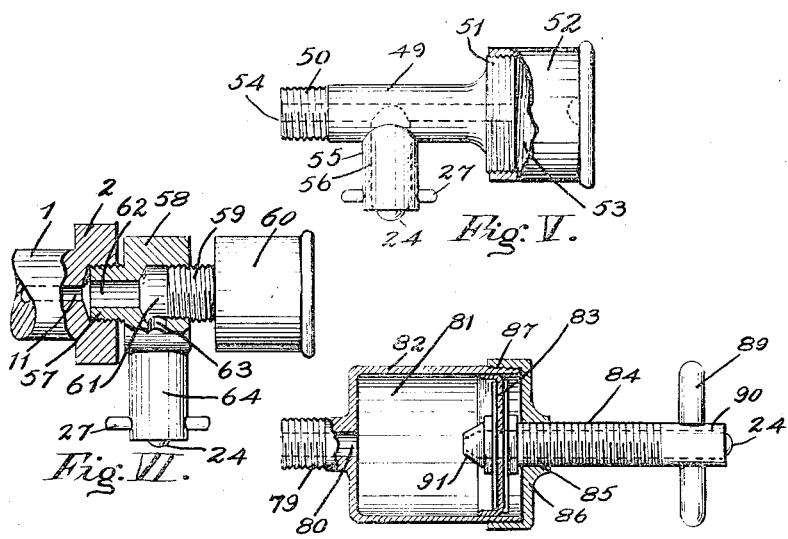
Fig. VI.
Fig. VII.
INVENTOR
John L. Creveling Patented Mar. 27, 1928.

1,663,797

UNITED STATES PATENT OFFICE.

JOHN L. CREVELING, OF ORACLE, ARIZONA, ASSIGNOR TO THE BASSICK MANUFACTURING COMPANY, OF CHICAGO, ILLINOIS, A CORPORATION OF DELAWARE.

LUBRICATING MEANS.

Application filed December 15, 1920. Serial No. 430,943.

My invention pertains to that class of lubricating means used for applying a lubricant to or between surfaces where at times a considerable pressure is required upon the lubricant to insure proper distribution thereof, and has for one of its principal objects to provide means whereby such application may readily be effected when desired.

As more specific objects, my invention comprehends means for carrying a lubricant from which it may readily be forced to the surfaces to be lubricated, from time to time, by a very simple operation, and also means whereby, if desired, a very heavy pressure may be exerted upon the lubricant at times to make sure that the spaces provided for the distribution thereof remain properly open and afford proper distribution. And a further object is to provide means whereby the receptacles for holding the lubricant may be readily filled without the necessity of removing the said receptacles from their operative positions, as will hereinafter more plainly appear. Other objects will be apparent from the following description.

In the drawing, Fig. I is a partial section and partial elevation showing one structure suitable for the employment of my invention;

Fig. II is an elevation and partial section of one type of filling connection which may be used in employing my invention;

Fig. III is a partial section and partial elevation of a grease cup suitable for employing my invention;

Fig. IV is an elevation and partial section of a lubricant supplying means which may be used in the employment of my invention; and Figs. V, VI, and VII are all partial elevations and partial sections illustrating modified structures for the employment of my invention.

As my invention is particularly applicable to the lubrication of springs which either support or are supported by studs or bolts, as is common in the construction of automobiles, its application will be described with particular reference to such a structure without any intent to in any way limit the use of my invention to such structure used for illustration merely.

In the drawing, 1 indicates a longitudinal section of a bolt having a head 2 and a threaded portion 3. The said bolt is shown as passing freely through an opening in the limb 4 of the spring shackle or clevis 5, the other limb 6 of which is tapped to receive the threaded portion 3 of the said bolt which may be held in proper adjustment by means of the lock-nut 7. 8 is a transverse section of a portion of the master-leaf of a spring, either carried by the bolt 1 or serving to support the bolt, as the case may be. The bearing surfaces of the spring 8 and the bolt 1, in this instance, are chosen for the purpose of lubrication, and the upper side of the bolt or pin 1 is shown as cut away slightly to form a space, as indicated at 9, into which it is desired the lubricant shall be distributed,—it being understood that the space 9 is so arranged that lubricant forced therein will be distributed to the proper bearing surfaces. 10 is a port communicating with the space indicated at 9 and also with the port or duct 11, one end of which is shown as communicating with the port 12 in the member 13, one end of which is screw-threaded, as indicated, into the end of the bolt 1 at 14. The enlarged end of member 13 is threaded, as indicated at 15, and provided with a cup or cap 16 forming, in effect, a grease cup of a more or less well-known type.

Within the cavity 17 of the cap 16 I provide a suitable boss 18 whereby, when the cap is screwed down sufficiently upon the thread at 15, the port 12 is effectively closed for a purpose that will hereinafter appear. The cap 16 may be provided with a suitable spring clip, as indicated at 19, which will prevent the cap from being accidentally screwed off of the threaded portion 15, though it may be removed when desired by raising spring 19 in an obvious manner. The other end of the port 11 communicates with the bore 20 of the fitting 21 which is screwed into the head 2 of the bolt, as indicated at 22. The said bore 20 is provided with a valve seat, as indicated at 23, against which a ball valve 24 is urged by any suitable means, as for example, the spiral spring indicated at 25 the opposite end of which is held in place by means of the pin 26. The fitting 21 is provided with two pins or lugs on opposite sides thereof, as indicated at 27.

The coupling indicated in Fig. II comprises a hollow sleeve shown in section at 28 which is provided on opposite sides with openings or slots 29 (see also Fig. IV)

adapted to engage the pins 27 of Fig. I when the sleeve 28 is made up upon the fitting 21 of Fig. I so as to form a "bayonet-joint". When the bayonet-joint is made up the washer or diaphragm 30 is pressed against the end of the fitting 21. The washer 30 is provided with a central aperture 31 registering with the port or duct 32 in the body portion 33 of the coupling; while the body portion is provided with lugs 34 whereby the same may be more readily handled in making or breaking the connection with the fitting 21. The stem 35 of the coupling is connected with any suitable means whereby a lubricant may be forced under considerable pressure through the duct or passage 32. And as many types of "grease guns" and other devices capable of supplying the lubricant under high pressure are well known in the art, the particular device used for this purpose is omitted here for the sake of simplicity merely, as the particular type chosen forms no part of my present invention.

In Fig. III, the member 36 is provided with a threaded portion 37, adapted to be made up into connection with the device to be lubricated, and an enlarged threaded portion, as indicated at 38, upon which is screwed the cap or receptacle 39 provided with a fitting 40 similar to the fitting 21 of Fig. I and having the pins 27 and the valve 24, as shown in the said Fig. I. The central opening or bore 41 of the fitting 40 communicates with the interior 42 of the cup or shell 39 with which the passage indicated in dotted lines at 43 also communicates.

In Fig. IV, 44 indicates a connecting sleeve provided with slots 29, as shown also in Fig. II, so as to form a bayonet-joint arrangement whereby the sleeve 44 may be made up upon the fitting 40, as is more plainly shown in section in Fig. II. The sleeve 44 has also a threaded portion 45 into which the nipple 46 of a collapsible tube, as indicated at 47, is made up, so that the interior of the tube 47 communicates with the bore 48 of the sleeve 44.

In Fig. V, the member 49 is provided with a threaded portion 50 adapted to be made up into the device to be lubricated; while the enlarged threaded portion 51 carries a cap or receptacle 52 with the interior 53 of which the port or duct 54, shown in dotted lines, communicates. 55 is a fitting or hollow post similar to the fitting 21 of Fig. I and is provided with the pins 27 and valve 24 similar to the like parts more plainly shown in Fig. I. The bore of the post or fitting 55, as indicated in dotted lines at 56, communicates with the passage 54 within the member 49.

In Fig. VI, the pin or bolt 1 is shown as having made up in the threaded portion of the head 2 thereof the nipple 57 of the fitting 58 into which is made up the nipple 59 of an ordinary grease cup 60, in such manner that the interior of the grease cup 60 communicates with the passage 61 within the fitting 58, which passage is connected with the port 62 and also the port 63 which communicates with the interior or bore of the post or fitting 64 which is similar to the fitting or post 22 of Fig. I and provided with pins 27 and valve 24, as indicated more plainly in Fig. I.

In Fig. VII, 79 represents a nipple which may be screwed into the device to be lubricated and communicates, as by means of the port 80, with the interior 81 of the shell or grease cup 82. Within the chamber 81 there is placed a suitable piston, as indicated at 83, which piston has its position determined by the position of the stem 84 which is screw-threaded, as indicated at 85, into the cap 86, screwed upon the shell 82, as indicated at 87. The stem 84 is provided with extensions or wings 89 whereby it may be revolved and is also provided with an internal bore, as indicated in dotted lines at 90, similar to the bore 20 of the fitting 21 in Fig. I. The bore 90 is closed at one end by a valve 24 similar to the like-numbered valve of Fig. I; while the opposite end of the bore 90 communicates with the interior 81 of the grease cup 82 and passes through a conical member 91 forming the end of the stem 84. The arrangement of the conical member 91 is such that, if the stem 84 be made up sufficiently into the thread of the cap 86, the member 91 will close the communication between the port 80 and the interior 81 of the grease cup 82 and maintain a direct communication between the bore 90 of the stem 84 and the bore 80 of the member 79. The wings or pins 89 upon the stem 84 are so arranged that they may be engaged by a suitable bayonet-joint arrangement similar to that shown in Fig. II, though, if desirable, of different dimensions. And, therefore, the said members 89 serve not only as wings or pins for grasping in the hand to turn the stem 84 but also serve the same purpose as the pins 27 of Fig. I, as will hereinafter more plainly appear.

An operation of my invention is substantially as follows:

With the parts assembled as shown in Fig. I, if it be desired to use an extremely high pressure upon the lubricant so as to insure its being forced between the surfaces to be lubricated or so as to force out any old lubricant or other matter that may be between said surfaces, it may be necessary or desirable to exert a greater pressure upon the lubricant than desired to have in the interior 17 of the grease cup or shell 16. And, therefore, under such conditions, it might be advisable to run the shell 16 down upon the thread 15 until the member 18 closes the bore 12. Then if the sleeve 28 be passed over the end of the member or post 21 and revolved approximately 90° from the position shown in the drawing, the longitudinal portions of the slots 29 will register with the pins 27, and the sleeve 28 may be moved upon the member 21 until the washer 30 comes into contact with the end of the post or member 21. If, then, the coupling of Fig. II be revolved in a right-hand direction, as by the members 34, it will be locked in place upon the stud or member 21 and lubricant under pressure may be supplied from the "grease gun" or other appropriate lubricant supplying means through the port 32, aperture 31, around the ball valve 24, through the bore 20, bore 11 and bore 12 until arrested by the member 18 closing the port 12. The pressure will then force the lubricant through the port 10 into the space 9 between the spring 8 and the bolt 1. And by applying sufficient pressure the lubricant may be forced around between these surfaces until it issues between the shackle and the spring, as for example, at the points indicated at 75, and this will visibly indicate that the lubricant has been properly distributed between the surfaces to be lubricated. And, if desired, considerable of the lubricant may be forced through in this manner to clean out the space between the surfaces to be lubricated and remove any old lubricant or foreign matter from the spaces. It will be obvious that a very high pressure may be used, if desired, upon the lubricant, thus forcing it between the surfaces to be lubricated without in any way tending to strain the grease cup shell 16. Then, after this very high pressure application has been made for the purposes above described, if the shell 16 be backed out upon the thread 15, until in the position shown in the drawing, the cavity 17 may readily be filled with the lubricant by means of the "grease gun" or other equivalent means used for supplying the lubricant under pressure through the port 32 of the coupling of Fig. II. As the air ordinarily contained in the cavity 17 will be gradually displaced by the incoming lubricant through the port 12, it will escape between the screw-threads at 15 which, however, may be made sufficiently tight to prevent any escape of lubricant, and the cup or cavity 17 may readily be filled solid full of the grease or other lubricant chosen for the purpose. Then, if the coupling of Fig. II be revolved in a left-hand direction, the bayonet-joint 27—29 will become disengaged and the coupling may be separated from the post 21, as shown in the drawing, whereupon spring 25 will force the valve 24 into the position shown in Fig. I and close the outlet of the port 20. When desired to again force more lubricant into the space 9 between the members 8 and 1, it will only be necessary to turn the shell 16 whereupon some of the lubricant contained therein will be forced from the port 12 into the port 11 and thence through the port 10 into the space 9. This operation may be repeated until all the lubricant contained in the cavity or cup 17 is used up, when the member 18 will again automatically close the port 12 so that, if desired, extremely high pressure may be used as first above outlined to clean out the old grease from the space 9 and replace the same with new, under extremely high pressure, if this be desired, and then cup 17 filled again with the new lubricant, as outlined above.

If that modification of my invention indicated in Fig. III be used for lubricating the surfaces at 9 of Fig. I, the nipple 37 of Fig. III may be made up in the head 2 of the member 1 in place of the member 21 shown in Fig. I, and the entire grease cup appearing as made up in the end 14 of the member 1 in Fig. I may be suppressed and the port 11 need only extend into the bolt 1 sufficiently to communicate with the port 10. Then if the coupling of Fig. II be made up upon the post 40 of Fig. III, lubricant may be forced under pressure past the valve 24 into the bore 41 and thence into the cavity 42 and thence through the port 43 into the port 11, and thence through port 10 into the space 9 where the lubricant is desired. And if the shell 39 of Fig. III be backed out into the position indicated in the drawing, the grease cup formed thereby will be filled during the same operation that lubricant is forced into the space 9 by means of the pump or gun or other device connected with the coupling of Fig. II for the purpose.

In cases where it is not necessary that greater pressure be exerted upon the lubricant than can be obtained by means of the ordinary grease cup, such as shown in Fig. III, a collapsible tube such as indicated at Fig. IV at 47 may readily be used. And in this figure I have shown a coupling having a sleeve 44 similar to the sleeve shown in section at 28 in Fig. II. This sleeve is shown as provided with the slots 29 which may engage the pins 27 to form a bayonet-joint and hold the coupling in proper position upon a stud, as shown at 40; while the collapsible tube 47 is shown as provided with a threaded portion 46 which may be made up into the thread 45 of the coupling member and then by pressure exerted upon the tube 47 the lubricant may be forced through port 48 past the valve 24, through port 41, as above described with reference to the coupling of Fig. II.

If that modification shown in Fig. V be used in the same surroundings as outlined above with respect to Fig. III, a lubricant may be forced past the valve 24 through the port or channel 56 into the port or channel 54, through the instrumentality of which it may be forced both into the cavity 53 formed by the cap 52 and also into the bore 11 and through the port 10 into the space 9, as above described. And thus at the one operation lubricant may be forced in between the surfaces to be lubricated and the grease cup 52—53 also filled, whereupon grease may be forced between the surfaces to be lubricated by merely turning the cap 52 upon the thread 51 until all of the grease is expelled from the chamber 53.

If the modification shown in Fig. VI be used, the coupling communicating with the means for supplying the lubricant under pressure may be made up upon the post 64, as outlined above, and then lubricant may be forced under pressure through the port 63 into the chamber 61 and thence through 62 and port 11 to the surfaces to be lubricated, and also from 61 through the nipple 59 into the grease cup 60 from which it may be expelled between the surfaces to be lubricated by simply turning member 60. It will be noted that in this modification the grease cup indicated at 59—60 may be the ordinary grease cup which might have been found made up in the head 2 in place of the nipple 57 of the fitting 58, which is used in incorporating my invention into the structure.

In that structure shown in Fig. VII, the stem 84 serves the purpose of the post 21 of Fig. I and the members 89 serve the purpose of the pins 27 upon the post of Fig. I. Therefore, a coupling similar to that of Fig. II may readily be made up upon the end of the stem 84 in a manner similar to that described above as only the dimensions need vary. Then lubricant under pressure can be forced past the valve 24 through the duct 90 in the stem 84 and will issue through the opening in the end of the conical member 91 within the cavity 81 formed by the shell 82. And thus the cavity 81 may be filled with lubricant and lubricant forced through the port 80 into the device to be lubricated into which the nipple 79 may be made up, as above illustrated. If it be desired to exert an extremely heavy pressure upon the lubricant, that is, more than desired to have in the cylinder 81, the stem 84 may be screwed down in the thread 85 until the conical member 91 closes the communication between the port 80 and the chamber 81, and then lubricant may be forced directly through the channel 90 in the stem 84 and through the port 80 until desired to fill the chamber 81, when the stem 84 may be backed into the position shown in the drawing and the chamber 81 filled with the lubricant. And then if the coupling be taken off the stem 84, the valve 24 will close the outlet through the stem and lubricant may be forced through the port 80 by simply turning the members 89 and the screw 84 connected therewith so as to force the piston 83 against the lubricant in an obvious manner.

While I have shown in each of the figures a valve similar to that shown in Fig. I, for the sake of simplicity, it will, of course, be evident that any other suitable means for preventing efflux of the lubricant when the filling means is disconnected may be used in place of the particular types of structure shown, without departing from my invention. And while I have shown the means for supplying a lubricant under pressure as comprising a bayonet-joint, it will be obvious that any other type of readily operable coupling means may be employed without departing from my invention.

It will also be obvious that many types of containers may be used to replace the specific types of grease cups which I have chosen for examples without departing from my invention.

From the foregoing it will be noted that I have produced a lubricating means whereby either light or heavy lubricants, as for example a cup grease, may be readily applied between surfaces where at times a very high pressure application may be desirable; and that, through the instrumentality of the same means, I easily fill containers with the lubricant which, after the supply means is disconnected, may be used to inject the lubricant between the surfaces to be lubricated; and when my invention is employed it is unnecessary to remove any portion of the receptacles or grease cups in order to fill the same, as is now common practice. And, therefore, the great difficulty in getting the removed portions back into their proper operating positions, when inaccessibly located, is avoided. And it will be noted also that the many advantages brought about by my invention are achieved with very simple and rugged apparatus.

I do not wish in any way to limit myself to any of the exact instrumentalities or devices or modes of operation given herein merely to illustrate embodiments of my invention, for it will be obvious that considerable departure therein may be made without departing from the spirit and scope of my invention which is as set forth in the following claims.

I claim:

1. Lubricating means comprehending in its structure a supply chamber and a duct communicating with said chamber and with a surface to be lubricated, means for forcing lubricant into said chamber through said duct, and means for preventing the pressure exerted upon a lubricant in said duct from being exerted upon an appreciable part of the supply chamber.

2. The combination with a member the external surface of which is adapted for use as a bearing surface provided with an outlet perforating said surface and a supply duct in communication therewith, of lubricant containing means in operative connection with one end of said supply duct whereby a lubricant may be retained and also expelled into said duct, means in operative communication with the opposite end of said duct and allowing the passage of a lubricant into said duct and restraining outward passage therefrom and attaching means adapted to engage a lubricant supplying means whereby lubricant is supplied to said duct and said containing means.

3. The combination with a member the external surface of which is adapted for use as a bearing surface provided with an outlet perforating said surface and a supply duct in communication therewith, of lubricant containing means in operative connection with one end of said supply duct whereby a lubricant may be retained and also expelled into said duct, means in operative communication with the opposite end of said duct and allowing the passage of a lubricant into said duct and restraining outward passage therefrom and attaching means adapted to engage a lubricant supplying means whereby lubricant is supplied to said duct and said containing means, and means for closing the communication between the supply duct and the lubricant containing means.

4. Lubricating means comprehending a receptacle for containing a lubricant and a duct communicating with said receptacle adapted to communicate with a surface to be lubricated, means for expelling the lubricant through said duct, attaching means whereby lubricant under pressure may be forced into said duct and said receptacle, and means whereby communication with the receptacle is cut off so that the lubricant may be forced into said duct under high pressure without such pressure being exerted upon the receptacle.

5. Lubricating means comprehending a receptacle for containing a lubricant and a duct communicating with said receptacle adapted to communicate with a surface to be lubricated, means for expelling the lubricant through said duct, attaching means whereby lubricant under pressure may be forced into said duct and said receptacle, and means controlling the connection of said duct and receptacle permitting higher pressure upon said duct than upon said receptable.

6. The combination with a lubricant receptacle and means operatively connected therewith for leading a lubricant to a bearing surface to be lubricated and means for forcing a lubricant from the receptacle thereto, of means for connecting a high-pressure source of lubricant with said leading means and said receptacle, and means for controlling said connection whereby the lubricant may be forced to the surface to be lubricated under higher pressure than that exerted upon the receptacle.

7. Lubricating means comprehending a receptacle for containing a lubricant and a duct communicating with said receptacle adapted to communicate with a surface to be lubricated, means for expelling the lubricant through said duct, attaching means whereby lubricant under pressure may be forced into said duct and said receptacle, and means whereby communication with the receptacle is cut off automatically by the operation of the expelling means so that the lubricant may be forced into said duct under high pressure without such pressure being exerted upon the receptacle.

8. Lubricating apparatus of the class described comprising an element having a bearing surface, a passage having an opening through said surface and other openings beyond said bearing surface, external storage means attached to said element and communicating with one of said other openings, and means for making a quick detachable connection with a source of lubricant supply separately attached to said element and communicating with a second of said other openings.

JOHN L. CREVELING.